United States Patent [19]

Lesesne

[11] Patent Number: 5,624,137
[45] Date of Patent: Apr. 29, 1997

[54] TOWABLE AUXILIARY FUEL TANK

[76] Inventor: Edward R. Lesesne, PSC #4, Box 253, APO, AA 34004-5000, Panama

[21] Appl. No.: 528,730

[22] Filed: Sep. 15, 1995

[51] Int. Cl.$^6$ ........................................ B60P 3/22
[52] U.S. Cl. .......................... 280/839; 280/834; 280/514
[58] Field of Search ........................ 280/830, 834, 280/839, 504, 514, 400, 420, 423.1

[56] References Cited

U.S. PATENT DOCUMENTS

| 1,045,992 | 12/1912 | Linn | 180/14.1 |
|---|---|---|---|
| 1,451,658 | 4/1923 | Hennekin | 280/504 |
| 1,832,042 | 11/1931 | Mohr | 280/504 |
| 1,966,022 | 7/1934 | Sumner | 280/834 X |
| 2,332,155 | 10/1943 | Lobelle et al. | 280/504 |
| 2,354,438 | 7/1944 | Craig | 280/830 |
| 2,356,920 | 8/1944 | Drescher | 280/504 |
| 2,376,336 | 5/1945 | Brown | 280/834 |
| 2,425,309 | 8/1947 | Ennis | 280/504 |
| 2,453,139 | 11/1948 | Kleinkort | 280/504 |
| 2,535,301 | 12/1950 | Tourneau | 280/834 |
| 2,700,555 | 1/1955 | Arend | 280/504 |
| 2,894,763 | 7/1959 | Karnath et al. | 280/504 |
| 3,295,482 | 1/1967 | Dountas et al. | 280/839 X |
| 3,489,432 | 1/1970 | Karlstrom | 280/504 |
| 3,677,284 | 7/1972 | Mendez | 137/351 |
| 4,693,164 | 9/1987 | Grinwald | 89/1.13 |

Primary Examiner—Kevin Hurley
Attorney, Agent, or Firm—Michael A. Mann, P.A.

[57] ABSTRACT

A towable, auxiliary fuel tank designed to transport a supply of fuel, so that a towing vehicle is able to consume the fuel present in the tank, thus extending the range of the vehicle. A ring is affixed to the trailer of the tank so that it may be connected to a vehicle. Attached to the vehicle is a hitch with a channel extending across a recess and a pin slidably mounted therein. The recess of the hitch is designed to hold the ring when the pin is closed, thus connecting the auxiliary tank to the vehicle. A lever is attached to the pin so that the ring may be connected and disconnected from the hitch. A cable is also attached to the pin and extends to a handle within the interior of the vehicle. When this handle is operated, the pin is moved from across the recess, thus unlocking the auxiliary tank from the vehicle. Fuel is transported from the auxiliary tank to the vehicle via a hose that is connected to both the auxiliary tank and vehicle. A securing device is provided to secure the hose to the vehicle. Furthermore, this securing device allows the hose to be disconnected from the vehicle when the auxiliary tank and vehicle are disconnected by operation of the handle.

20 Claims, 2 Drawing Sheets

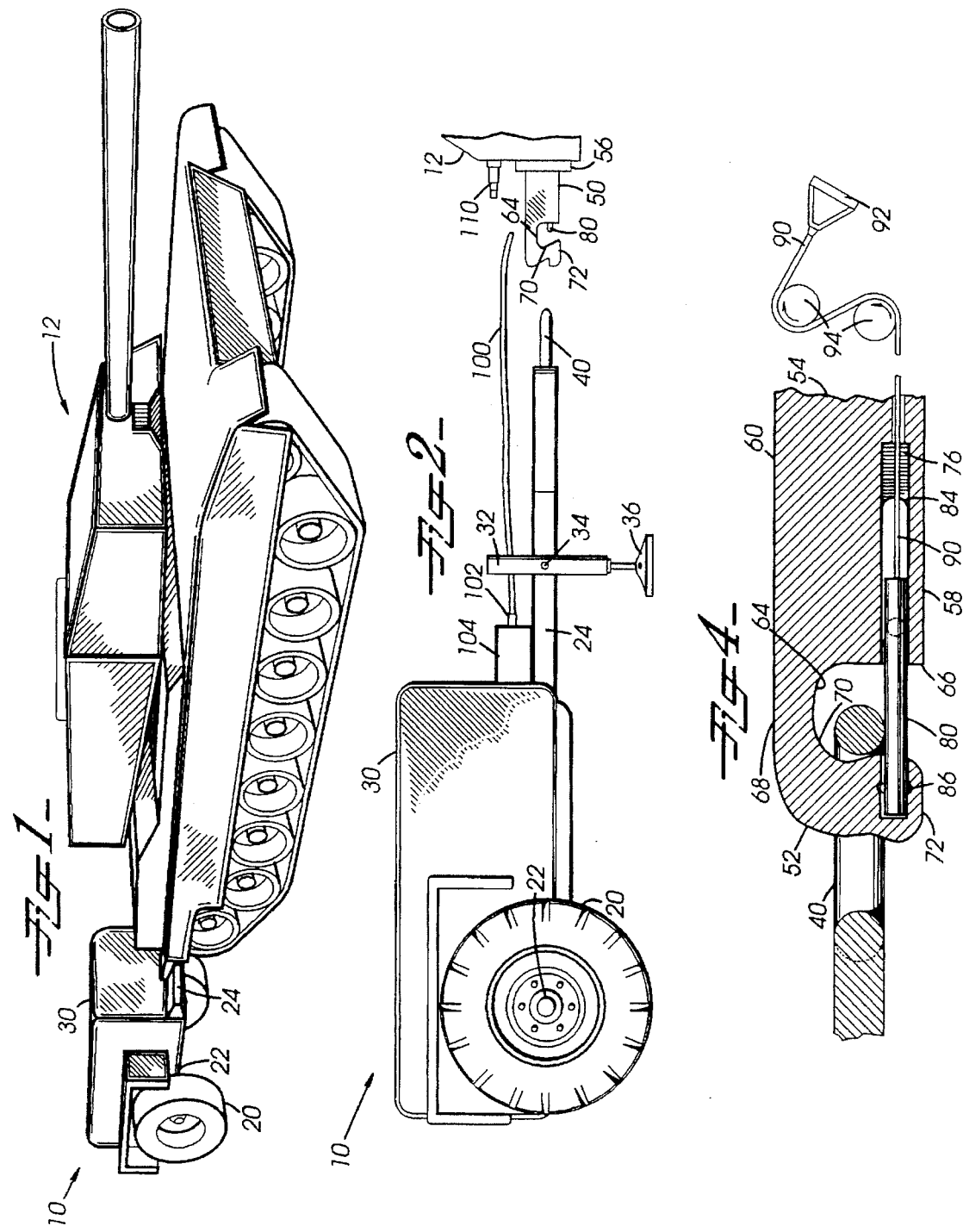

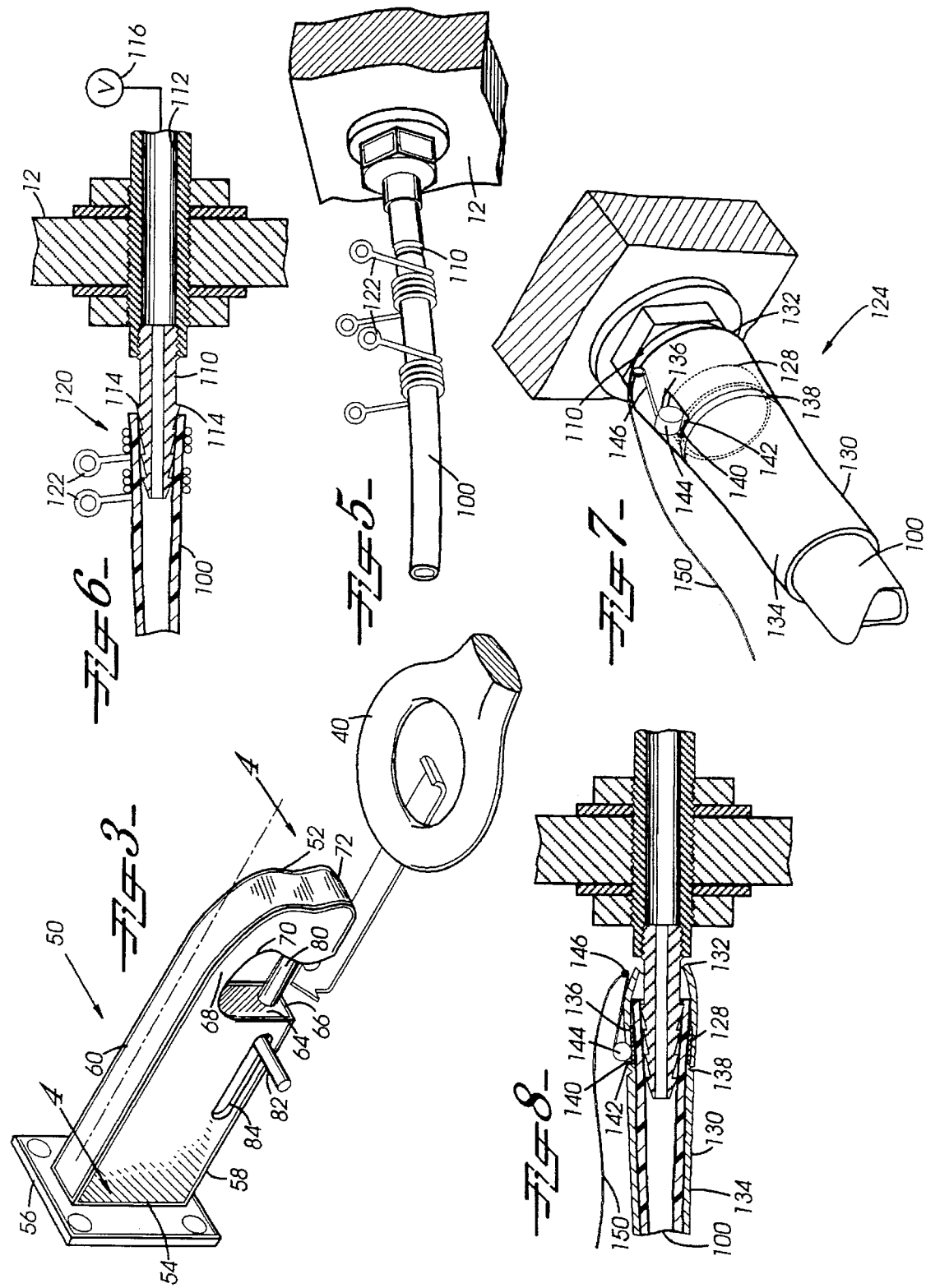

TOWABLE AUXILIARY FUEL TANK

BACKGROUND OF THE INVENTION

1. Field of the Invention

This invention relates to a system for providing an auxiliary fuel supply for motor vehicles that are capable of pulling trailers. More specifically, this invention relates to an auxiliary fuel supply and transfer system for a tank or other military vehicle that is capable of towing a fuel tank.

2. Discussion of Background

Military tanks and Bradley Fighting Vehicles (hereinafter vehicle) normally include either gasoline or diesel engines and a corresponding internal fuel tank. However, these internal fuel tanks are limited in size, because they must be protected within the skin of the vehicle. These vehicles are generally used during offensive or attack maneuvers and require large quantifies of fuel to continue their onslaught. During breaks in these maneuvers, the vehicles must be refueled, or risk running out of fuel and thus severely limiting both offensive and defensive capabilities. Another disadvantage of the limited internal fuel tank is the relatively low range the vehicles may travel without refueling.

Several systems have been developed for supplying or transporting additional fuel for a vehicle. In U.S. Pat. Nos. 2,376,336 and 2,354,438, Brown and Craig, respectively, recognize the problem and provide quick release fuel tanks that are strapped externally to the military vehicles. When the vehicles run low on fuel, the fuel within the external tanks is introduced into the internal tanks, thus refueling the vehicle. Furthermore, if the vehicle encounters combat or other dangerous situations, the external tanks can be released, thus removing a possible explosion source from the vehicle. Although the fuel tanks can possibly be retrieved later, the fuel is consumed by the vehicle when it is eventually transferred into the internal fuel tank of the vehicle.

In U.S. Pat. No. 3,677,284, Mendez discloses a Fuel Transfer System For Tractor Trailer Vehicles. In this system, the tractor tows an additional source of fuel present in an external tank on the trailer. The source of fuel for the tractor, its internal fuel tank or the external fuel tank, can be alternated from within the tractor. However, Mendez lacks the capability of releasing the external fuel supply from within the vehicle during an emergency or otherwise dangerous situation. Therefore, there remains a need for a fuel transfer system that permits the towing vehicle to consume the towed fuel, while having an emergency means of disengaging the external supply of fuel if a dangerous situation arises.

SUMMARY OF THE INVENTION

According to its major aspects and broadly stated, the present invention is a towable auxiliary fuel tank. The auxiliary fuel tank is designed to carry a supply of fuel and be towed behind a vehicle while the vehicle consumes the fuel within the tank, thus extending the range of the vehicle.

The auxiliary fuel tank comprises a trailer with at least one pair of wheels and an axle so that it may be transported easily. A fuel container is positioned on the frame having a towing ring, thus enabling the auxiliary fuel tank to connect to a hitch positioned on the rear of a vehicle. Furthermore, the fuel container may be coated with a protective armored surface or specifically shaped to deflect small arms fire.

The hitch is generally rectangular in shape with a recess formed therein. The recess has a protrusion extending away from the rear of the vehicle that causes the end of the hitch proximate to the auxiliary fuel tank to form a bulb. The opening of the recess is dimensioned and contoured so that the ring slides easily into and out of the recess and does not bind when the auxiliary fuel tank is being towed.

A channel is formed within the hitch which extends from the end attached to the vehicle, through the length of the hitch, across the recess, and into the bulb. A pin fits within this channel and can slide between a closed position wherein the pin extends across the opening of the recess into the bulb, and an open position, wherein the pin is withdrawn into the hitch, thus clearing the opening of the recess. The pin, in its closed position, is held securely by a ball detent within the channel. A lever extends from the pin through a slot in the side of the hitch, so that the pin may be manually moved between its open and closed positions. As the pin slides within the channel, the lever slides within the slot.

The hitch is designed so that the auxiliary fuel tank and the vehicle may be connected and disconnected quickly and easily. The lever of the hitch serves as one means for manually locking and unlocking the ring in the recess. A second system of disengaging the auxiliary fuel tank from the vehicle is used during emergency situations. This system includes a cable attached to the pin within the channel of the hitch. The cable extends through the interior of the vehicle to a handle. When the handle is operated, the pin moves from the closed position to the open position, thus unlocking the ring from the recess of the hitch.

The fuel within the auxiliary fuel tank is used first by the vehicle so that its internal fuel tank remains full. Then, the auxiliary fuel tank can be released and the vehicle drives forward on its internal fuel tank. One end of a hose is attached to the auxiliary fuel tank; the other end of the hose is connected to the vehicle. A valve within the vehicle is used to connect one of the two sources of fuel to the engine. For instance, if the auxiliary tank is disconnected from the vehicle, the engine will consume the fuel from the internal tank. An auxiliary fuel pump, carried by the trailer, may be provided to pump fuel into the vehicle's internal tank or a third vehicle's internal tank.

In the preferred embodiment, to connect the hose to the nozzle on the vehicle, at least one spring clip is placed over the hose, thus pinching the hose about the nozzle. In this manner the hose is securely held about the nozzle, but will snap off if the auxiliary fuel tank is disconnected from the vehicle. In an alternative embodiment of the present invention, the fuel hose is also placed over a nozzle on the vehicle; however, a compression ring is placed around the hose over the nozzle. A sleeve is subsequently placed over the hose and compression ring. The sleeve has a cam device so that when it is in place, the cam compresses the compression ring about the hose, thus securing the fuel hose to the nozzle. A tether attached to the cam device actuates if the auxiliary fuel tank is released from the vehicle, thus disengaging the cam and compression ring, and subsequently releasing the hose from the nozzle.

An important feature of the present invention is that the auxiliary towable fuel tank supplies a consumable source of fuel to a vehicle. The capability of the vehicle to consume the fuel from within the auxiliary fuel tank without consuming the fuel from its own internal tank extends the effective range of the vehicle.

Another feature of the present invention is the emergency disconnect of the hitch. When the handle is operated from inside the vehicle, the auxiliary fuel tank is released. This serves as an important function if the vehicle enters a dangerous situation where towing an auxiliary fuel tank would be a liability, such as in a combat environment. If this situation occurs, an operator merely has to use the handle, thus releasing the auxiliary tank from the vehicle.

Yet another feature of the present invention is the fuel hose and pump. The fuel hose and pump transfer fuel between the auxiliary fuel tank and the internal fuel tank of the vehicle, or possibly between the auxiliary tank and a third vehicle.

Still another feature of the present invention is the spring clip and sleeve and compression ring for the securing the fuel hose to the vehicle. These devices, discussed in two separate embodiments above, allows the hose to be secured to the nozzle and subsequently removed from the towing vehicle when the handle is operated to disconnect the auxiliary fuel tank from the vehicle.

Yet another feature of the present invention is the structure and coating of the auxiliary fuel tank. An armored coating and rounded surface help deflect small arms fire from penetrating the auxiliary fuel tank. It is necessary to protect the auxiliary fuel tank because an enclosed supply of fuel within the auxiliary fuel tank is a possible source of explosion, increasing the danger to the vehicle.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a perspective view of a towable auxiliary fuel tank being towed by a military vehicle according to a preferred embodiment of the present invention;

FIG. 2 is a plan view of a towable auxiliary fuel tank disconnected from the hitch of a vehicle according to a preferred embodiment of the present invention;

FIG. 3 is a perspective view of a hitch and ring according to a preferred embodiment of the present invention;

FIG. 4 is a cross-sectional view of a hitch and ring through the line 4—4 of FIG. 3 according to a preferred embodiment of the present invention;

FIG. 5 is a perspective view of the hose attached to the nozzle of the vehicle according to a preferred embodiment of the present invention;

FIG. 6 is a cross-sectional view of the hose attached to the nozzle of the vehicle according to a preferred embodiment of the present invention;

FIG. 7 is a perspective view of the hose attached to the nozzle of the vehicle according to an alternative embodiment of the present invention; and FIG. 8 is a cross-sectional view of the hose attached to the nozzle of the vehicle according to an alternative embodiment of the present invention.

DETAILED DESCRIPTION OF A PREFERRED EMBODIMENT

In the following description, similar components are referred to by the same reference numeral in order to simplify the understanding of the sequential aspect of the drawings.

Referring now to FIGS. 1 and 2, a towable, auxiliary fuel tank 10 (HEREINAFTER auxiliary fuel tank) is shown in conjunction with a military vehicle 12 (HEREINAFTER vehicle). Auxiliary fuel tank 10 is designed to carry a quantity of fuel and supply this fuel to vehicle 12, so that the internal fuel tank of vehicle 12 will remain full while vehicle 12 consumes the fuel present in auxiliary fuel tank 10. This will not only increase the effective range of vehicle 12, but will also reduce the repeated stopping and refueling vehicle 12. It should also be noted that vehicle 12 is shown as a military tank, but could be any other military vehicle or civilian vehicle that would be served by auxiliary fuel tank 10.

Auxiliary fuel tank 10 comprises a trailer 24 with at least one pair of wheels 20 and a corresponding axle 22. A container 30 is also mounted to trailer 24, so that a quantity of liquid, namely fuel, can be transported by auxiliary fuel tank 10. A support 32 with a foot 36 is able to pivot about pivot point 34 to support tank 10 when it is not in use. Support 32 is carried by trailer 24 and when auxiliary fuel tank 10 is being transported, support 32 pivots out of the way, so that it extends parallel with trailer 24. Trailer 24 also comprises a ring 40, thus enabling auxiliary fuel tank 10 to be connected to vehicle 12. Ring 40 is annular in shape and extends from trailer 24, so that ring 40 lies in a plane parallel to trailer 24.

Container 30 is approximately rounded and coated with a protective surface to deflect small arms fire, including relatively small caliber weapons. A suitable protective surface would be armor plating or merely an extra thickness of steel that is provided to prevent small arms fire from penetrating container 30. Typically, container 30 will be transporting a supply of fuel and any puncture and subsequent spark is likely to cause an explosion, thus increasing the danger associated to vehicle 12. Therefore, in a military type setting it is necessary to provide the container with suitable protection. However, with most non-military operations, the protective coating would not be required as the danger of small arms fire is greatly reduced.

Referring now to FIGS. 2–4, to connect auxiliary fuel tank 10 to vehicle 12, ring 40 attaches to a hitch 50 on the rear of vehicle 12. Hitch 50 has a first end 52 and a second end 54. A base plate 56 is attached to second end 54 and is typically affixed to the rear of vehicle 12. Base plate 56 can be attached to vehicle 12 in any suitable manner known to those skilled in the art, including bolts or welds, so that hitch 50 and vehicle 12 is capable of towing auxiliary fuel tank 10.

Hitch 50 is generally rectangular in shape, having a bottom 58, a top 60, and as stated above, first end 52 and second end 54. Hitch 50 also has a recess 64 formed therein. Recess 64 enters hitch 50 from its bottom 58 proximate to first end 52 and extends within hitch 50 towards top 60. Recess 64 also has a protrusion 70 that extends towards first end 52 within hitch 50. A neck 68 is formed near top 60 of hitch 50 by recess 64 and protrusion 70. Recess 64 and protrusion 70 also form a bulb 72 from first end 52 of hitch 50. Bulb 72 extends from neck 68, thus forming an opening 66 in recess 64. Hitch 50 is designed so that ring 40 can fit within opening 66 and subsequently rest in protrusion 70 of recess 64, when auxiliary fuel tank 10 is being towed by vehicle 12.

Additionally, hitch 50 has a channel 76 proximate to bottom 58 extending from second end 54, across opening 66 of recess 64, into bulb 72. Channel 76 has a generally circular cross-section and a diameter smaller than the thickness of hitch 50. A pin 80 is slidably mounted within channel 76. Pin 80 is in a closed position when pin 80 extends across opening 66 and penetrates bulb 72, thus effectively closing recess 64 and capturing ring 40, as best illustrated in FIG. 4. Pin 80 is in an open position when pin 80 is withdrawn into hitch 50, so that it does not extend across opening 66. In this open position, as best seen in FIG. 2, ring 40 is designed to pass through opening 66 into and out of recess 64. Once ring 40 is within recess 64 and pin 80 is in the closed position, ring 40 has sufficient room to pivot, rotate, or otherwise move within recess 64, so that as auxiliary fuel tank 10 is being towed, ring 40 does not bind within recess 64.

Pin 80 has a lever 82 extending perpendicular from its length and which serves as a manual device for moving pin 80 between its open and closed positions. Lever 82 extends from pin 80 through a slot in the side of hitch 50, so that as pin 80 is moved between its two positions, lever 82 slides within slot 84. Pin 80 is retained in its closed position within channel 76 by a ball detent 86. The ball detent 86 is typical to what is known to those skilled in the art and is generally comprised of at least one ball that is spring biased within pin 80 so that the ball forms a "bump". Channel 76 typically will have a "dent" within its walls so that as the ball is biased toward the channel, the ball will seat itself into the "dent", thus securing itself. Other types of ball detent means are known and apparent to those skilled in the art and, as such, are within the scope of this disclosure.

A cable 90 is attached to pin 80 within channel 76. Cable 90 extends through channel 76, through second end 54 and into vehicle 12. Once inside vehicle 12, cable 90 travels through a series of pulleys or guides 94 until it reaches the interior compartment of vehicle 12. At this point, cable 90 is connected to a handle 92 so that when handle 92 is operated, pin 80 moves from its closed to its open position, thus unlocking ring 40 from hitch 50. Handle 92 provides the second system for disengaging auxiliary fuel tank 10 from vehicle 12, as lever 82 can also be manually operated to pin 80 between its two positions.

It should also be noted that it is contemplated that a safety pin or other suitable device will be inserted proximate to handle 92, once pin 80 is in the closed position. The safety pin will eliminate the possibility of prematurely or inadvertently releasing pin 80. Thus to operate handle 92, the safety pin would have to be removed before pin 80 could be moved to the closed position.

In operation, auxiliary fuel tank 10 is typically attached to vehicle 12 manually by lever 82. In a non-emergency situation, auxiliary fuel tank 10 can also be disconnected from vehicle 12 by lever 82. However, during an emergency situation where it is necessary to discard auxiliary fuel tank 10 quickly and when vehicle 12 and auxiliary fuel tank 10 are in motion, handle 92 can be operated from within vehicle 12, thus moving pin 80 from the closed position and unlocking ring 40. In the open position, ring 40 will effectively fall through opening 66 of recess 64, thus disengaging auxiliary fuel tank 10 from vehicle 12.

It should be also noted that other means, including electronically actuated devices, could replace handle 92 and be used to move pin 80 from its closed to open position. These modifications are anticipated and therefore are within the scope of this disclosure.

As described above, auxiliary fuel tank 10 supplies vehicle 12 with an external supply of fuel when auxiliary fuel tank 10 is being towed by vehicle 12. A hose 100 transports fuel between auxiliary fuel tank 10 and vehicle 12, as best seen in FIG. 2. When handle 92 is operated, unlocking ring 40 from hitch 50 and releasing auxiliary fuel tank 10 from vehicle 12, hose 100 is approximately simultaneously released from vehicle 12, as will be described in detail below.

Hose 100 is affixed to container 30 through a connector 102 and possibly could be affixed to a pump 104. Connector 102 merely provides a fluid connection between the interior of container 30 and hose 100. Pump 104 is not necessarily required to pump fuel between auxiliary fuel tank 10 and vehicle 12, because an interior fuel pump on vehicle 12 may provide the necessary pressure to transfer the fuel. Pump 104, typically an auxiliary electric fuel pump, is essentially provided to transfer fuel from within container 30 of auxiliary fuel tank 10 to a third vehicle or, if necessary, to top off the internal fuel tank of vehicle 12

Hose 100 is connected to vehicle 12 in a manner that permits it to be disconnected quickly and easily. If auxiliary fuel tank 10 is released from vehicle 12 during an emergency situation as described above, hose 100 must be able to be released from vehicle 12 just as quickly. Vehicle 12 is supplied with a nozzle 110 that permits fuel within hose 100 to be consumed by vehicle 12. Nozzle 110 is a basic fluid connection port that has a series of raised ridges 114 that permit hose 100 to be easily slid onto nozzle 110, but requires greater difficulty to remove hose 100 from nozzle 110. Furthermore, nozzle 110, as illustrated in FIGS. 5–8, is connected to a fuel line 112 in vehicle 12. Fuel flows through hose 100, into nozzle 110, and into fuel line 112, so that vehicle 12 consumes the fuel present in auxiliary fuel tank 10. A valve 116, that determines the source of fuel vehicle 12 consumes, is positioned within fuel line 112. If, for instance, auxiliary fuel tank 10 is released from vehicle 12, valve 116 would be actuated to close fuel line 112, and vehicle 12 would consume fuel from its internal fuel tank.

In a preferred embodiment of the present invention, as illustrated in FIGS. 5 and 6, at least one spring clip 122, preferably more, is used to secure hose 100 to nozzle 110. In operation, at least one spring clip 122 is slipped over hose 100. Hose 100 is subsequently fitted about nozzle 110. Spring clip 122 is compressed so that its internal cavity enlarges, and is then slid over hose 100 and nozzle 110. Spring clip 122 is positioned between a pair of ridges 114, and when spring clip 122 is subsequently released, its internal cavity contracts about hose 100 and nozzle 110, thus securing hose 100 to nozzle 110. During an emergency situation, when auxiliary fuel tank 10 is unlocked and released from vehicle 12, the weight and force of auxiliary fuel tank 10, slowing down relative to vehicle 12, snaps hose 100 and spring clip 122 from nozzle 110.

An alternative embodiment for securing hose 100 to nozzle 110 is shown in FIGS. 7 and 8. In this alternative embodiment, a compression ring 128 and a sleeve 130 having a first end 132 and a second end 134 that work in conjunction to secure hose 100 to nozzle 110. Sleeve 130 is generally a hollow cylinder where first end 132 has a larger interior and exterior diameter than second end 134. Within the radial surface and extending through sleeve 130 is a hole 136. Positioned proximate to hole 136 and within the interior of sleeve 130 is a rib 138. Rib 138 is an indentation within the interior of sleeve 130 having a smaller inner diameter than the surrounding diameter of sleeve 130. Positioned adjacent to hole 136 and proximate to first end 132 is a holder 140. Holder 140 is a U-shaped member designed to support a cam 144 and a cam lever 146 about a pivot 142. Pivot 142 is a pin extending through cam 144 and the legs of holder 140. Cam 144 is dimension and contoured so that as it pivots about pivot 142, cam 144 extends through hole 136 within the interior of sleeve 130. Cam lever 146 is an extension attached to cam 144 and is designed to help cam 144 pivot about pivot 142.

To engage the alternative embodiment, sleeve 130 is first placed over hose 100 and then compression ring 128. Hose 100 is subsequently fitted over nozzle 110 of vehicle 12 and compression ring 128 is slid over hose 100 and nozzle 110, positioning it between a pair of ridges 114. Sleeve 130 is then slid over compression ring 128, hose 100, and nozzle 110, so that hole 136 is aligned over compression ring 128. Hole 136 will automatically align over compression ring 128 because rib 138 will engage compression ring 128 as sleeve 130 is slid over hose 100 and nozzle 110. This engagement ceases the movement of sleeve 130 about hose 100 and nozzle 110, thus aligning hole 136 over compression ring 128 consistently. Cam 144 is then pivoted so that as cam 144 extends through sleeve 130, cam 144 presses down and subsequently compresses compression ring 128 about hose 100 and nozzle 110.

A tether 150 is attached to cam lever 146 at one end and to auxiliary fuel tank 10 at its other end. During an emergency situation, when handle 92 is operated and auxiliary fuel tank 10 is released from vehicle 12, cam 144, sleeve 130, and compression ring 128 release hose 100 from nozzle 110. As auxiliary fuel tank 10 is released it begins to drop back with respect to vehicle 12, and as it does tether 150 is tightened. This tension operates cam lever 146 and pivots cam 144 so that the pressure is released from compression ring 128, thus permitting hose 100 to be snapped off nozzle 110. As in the preferred embodiment, when vehicle 12 is without auxiliary fuel tank 10 and an external source of fuel, vehicle 12 begins to consume the fuel in its internal tank.

It will be apparent to those skilled in the art that many changes and substitutions can be made to the preferred embodiment herein described without departing from the spirit and scope of the present invention as defined by the appended claims.

What is claimed is:

1. A fuel transfer system comprising;
   a vehicle;
   a trailer having a container capable of holding a quantity of fuel;
   means for transferring said fuel from said container to said vehicle so that said fuel is immediately consumed by said vehicle; and
   means for releasably disconnecting said trailer from said vehicle, said disconnecting means being operable when said vehicle is moving.

2. The system as recited in claim 1, wherein said disconnecting means comprises;
   a ring carried by said trailer; and
   a remotely, releasable hitch carried by said vehicle.

3. The system as recited in claim 1, wherein said disconnecting means comprises;
   a ring carried by said trailer;
   a hitch carried by said vehicle, said hitch having an open and closed position, said hitch dimensioned to enclose said ring when said hitch is in said closed position, and said ring being removable from said hitch when said hitch is in said open position; and
   means for opening said hitch; said opening means operable from said vehicle.

4. The system as recited in claim 1, wherein said disconnecting means comprises;
   a ring carried by said trailer;
   a hitch carried by said vehicle, said hitch having an approximately rectangular shape with a first end, a second end, a bottom, and a top;
   a recess protruding into said hitch from said bottom towards said top of said hitch proximate to said first end, said recess having a protrusion extending towards said first end, so that said first end of said hitch forms a bulb;
   a channel within said hitch, said channel penetrating said second end and extending through said hitch proximate to said bottom, so that said channel penetrates said bulb;
   a pin slidably mounted within said channel, said pin having an open and closed position; and
   means for moving said pin from said closed position to said open position, said moving means positioned within said vehicle.

5. The system as recited in claim 1, wherein said transferring means comprises;
   a hose in fluid communication with said vehicle and said container; and
   means for releasably securing said hose to said vehicle and said container.

6. The system as recited in claim 1, wherein said transferring means comprises;
   a hose in fluid communication with said vehicle and said container;
   a nozzle carried by said vehicle; and
   at least one spring clip securing said hose to said nozzle of said vehicle.

7. The system as recited in claim 1, wherein said transferring means comprises;
   a hose in fluid communication with said vehicle and said container;
   a nozzle carried by said vehicle;
   a compression spring positioned about said hose and said nozzle;
   a sleeve dimensioned to slide over said nozzle, said hose, and said compression spring;
   a cam carried by said sleeve for compressing said compression spring about said hose and said nozzle; and
   means for disengaging said cam, so that said hose is released from said nozzle.

8. The system as recited in claim 1, wherein said transferring means comprises;
   a pump carried by said trailer; and
   a hose in fluid communication with said pump for transferring said fuel.

9. The system as recited in claim 1, wherein said container is armored and dimensioned to deflect small arms fire.

10. A fuel transfer system comprising;
    a vehicle having a nozzle;
    a trailer having a container capable of holding a quantity of fuel;
    a hose in fluid communication with said vehicle and said container, whereby said hose transfers said fuel from said container to said vehicle, so that said fuel is immediately consumed by said vehicle; and
    means for releasably securing said hose to said nozzle of said vehicle;
    means for releasably disconnecting said trailer from said vehicle, said disconnecting means being operable when said vehicle is moving.

11. The system as recited in claim 10, wherein said disconnecting means comprises;
    a ring carried by said trailer; and
    a remotely, releasable hitch carried by said vehicle.

12. The system as recited in claim 10, wherein said disconnecting means comprises;
    a ring carried by said trailer;
    a hitch carried by said vehicle, said hitch having an open and closed position, said hitch dimensioned to enclose said ring when said hitch is in said closed position, and said ring being removable from said hitch when said hitch is in said open position; and means for opening said hitch, said opening means operable from said vehicle.

13. The system as recited in claim 10, wherein said disconnecting means comprises;

a ring carried by said trailer;

a hitch carried by said vehicle, said hitch having an approximately rectangular shape with a first end, a second end, a bottom, and a top;

a recess protruding into said hitch from said bottom towards said top of said hitch proximate to said first end, said recess having a protrusion extending towards said first end, so that said first end of said hitch forms a bulb;

a channel within said hitch, said channel penetrating said second end and extending through said hitch proximate to said bottom, so that said channel penetrates said bulb; and a pin slidably mounted within said channel, said pin having an open and closed position; and means for moving said pin from said closed position to said open position, said moving means positioned within said vehicle.

14. The system as recited in claim 10, wherein said securing means comprises at least one spring clip securing said hose to said nozzle of said vehicle.

15. The system as recited in claim 10, wherein said securing means comprises;

a compression spring positioned about said hose and said nozzle;

a sleeve dimensioned to slide over said nozzle, said hose, and said compression spring;

a cam carried by said sleeve for compressing said compression spring about said hose and said nozzle; and means for disengaging said cam, so that said hose is released from said nozzle.

16. The system as recited in claim 10, wherein said container is armored and dimensioned to deflect small arms fire.

17. A fuel transfer system comprising;

a trailer having a container capable of holding a quantity of fuel;

a ring carried by said trailer;

a vehicle having a nozzle;

a remotely, releasable hitch carried by said vehicle, said hitch having an open and closed position, said hitch dimensioned to enclose said ring when said hitch is in said closed position, and said ring being removable from said hitch when said hitch is in said open position;

means carried by said vehicle for opening said hitch to release said ring;

a hose in fluid communication with said vehicle and said container, whereby said hose transfers said fuel from said container to said vehicle, so that said fuel is immediately consumed by said vehicle; and means for releasably securing said hose to said nozzle of said vehicle.

18. The system as recited in claim 17, wherein said securing means comprises at least one spring clip securing said hose to said nozzle of said vehicle.

19. The system as recited in claim 17, wherein said securing means comprises;

a compression spring positioned about said hose and said nozzle;

a sleeve dimensioned to slide over said nozzle, said hose, and said compression spring;

a cam carried by said sleeve for compressing said compression spring about said hose and said nozzle; and means for disengaging said cam, so that said hose is released from said nozzle.

20. The system as recited in claim 17, wherein said opening means comprises a handle within said vehicle, so that when said handle is operated, said hitch opens releasing said ring.

* * * * *